US009679333B2

(12) United States Patent
Lutnick et al.

(10) Patent No.: US 9,679,333 B2
(45) Date of Patent: Jun. 13, 2017

(54) SYSTEMS AND METHODS FOR PROVIDING NON-FULLY-TRANSPARENT MARKETS (75) Inventors: Howard W. Lutnick, New York, NY (US); Peter Bartko, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 2730 days.

(21) Appl. No.: 11/741,582

(22) Filed: Apr. 27, 2007

(65) Prior Publication Data

US 2008/0082440 A1    Apr. 3, 2008

Related U.S. Application Data (60) Provisional application No. 60/745,842, filed on Apr. 27, 2006, provisional application No. 60/802,658, filed on May 22, 2006.

(51) Int. Cl.
G06Q 40/00 (2012.01)
G06Q 30/08 (2012.01)
G06Q 40/04 (2012.01)

(52) U.S. Cl.
CPC ........... *G06Q 30/08* (2013.01); *G06Q 40/04* (2013.01)

(58) Field of Classification Search
CPC ......... G06Q 40/00; G06Q 40/04; G06Q 40/06
USPC ........................................... 705/35, 36 R, 37
See application file for complete search history.

(56) References Cited

U.S. PATENT DOCUMENTS

| 7,587,346 B2 * | 9/2009 | Malitzis ......................... 705/35 |
| 2002/0073014 A1 | 6/2002 | Gilbert |
| 2002/0152152 A1 * | 10/2002 | Abdelnur et al. ............... 705/37 |
| 2002/0161687 A1 * | 10/2002 | Serkin et al. ................... 705/37 |
| 2003/0009412 A1 * | 1/2003 | Furbush et al. ................ 705/37 |
| 2003/0093343 A1 * | 5/2003 | Huttenlocher et al. ......... 705/35 |
| 2003/0154152 A1 * | 8/2003 | Gilbert et al. .................. 705/37 |

FOREIGN PATENT DOCUMENTS

| JP | 2004-46541 | 12/2001 |
| JP | 2001-344421 | 2/2004 |

OTHER PUBLICATIONS

Australian Examination Report for Application No. 2007244699 dated Jan. 29, 2010; 2 pages.
Notice of Acceptance for Application No. 2007244699 dated Apr. 20, 2011; 3 pages.
Australian Examination Report for Application No. 2011211393 dated Sep. 16, 2013; 2 pages.
Canadian Examination Report for Application No. 2,650,782 dated Mar. 21, 2012; 4 pages.
Canadian Examination Report for Application No. 2,650,782 dated Jul. 14, 2014; 4 pages.

(Continued)

*Primary Examiner* — Lalita M Hamilton (57) ABSTRACT

Method and systems are provided herewith for providing non-fully-transparent markets that includes or involves the step or steps of receiving a request to reveal a bid or an offer, in which the request is submitted by a user of an electronic trading system; transmitting a price and a size that corresponds to the bid or the offer; waiting a pre-determined period of time; and executing the bid or the offer at a default price and a default size, in the event that the user does not submit a command to trade within the pre-determined period of time.

20 Claims, 3 Drawing Sheets

(56) References Cited

OTHER PUBLICATIONS

European Extended Search Report for Application No. 07761513.6 dated Jul. 20, 2011; 7 pages.
Notice from the European Patent Office dated Oct. 1, 2007 concerning business methods; Official Journal of the European Patent Office, vol. 30, No. 11; Nov. 1, 2007; 2 pages.
Japanese Office Action w/English translation for Application No. 2009-507994 mailed Aug. 28, 2012; 8 pages.
Japanese Office Action w/English translation for Application No. 2009-507994 mailed Jun. 25, 2013; 4 pages.
Japanese Office Action w/English translation for Application No. 2013-262967 mailed Apr. 14, 2015; 6 pages.
Notification of Transmittal of the International Search Report and the Written Opinion of the International Searching Authority mailed Jun. 17, 2008; 12 pages.
Australian First Examiners Report for Application No. 2015203271 dated Apr. 29, 2016; 2 pages.
Canadian Examiners Report for Application No. 2650782 dated Sep. 2, 2016; 4 pages.

\* cited by examiner

|                                  | EUR/USD | USD/JPY | etc |
|----------------------------------|---------|---------|-----|
| Number active feeds              |         |         |     |
| Current intra-day volume dealt   |         |         |     |
| Last hour running avg spread     |         |         |     |
| Last hour running avg depth best |         |         |     |

EUR/USD  6  14,125  2.5  27  29

Fig. 3

SYSTEMS AND METHODS FOR PROVIDING NON-FULLY-TRANSPARENT MARKETS

The present application claims priority to U.S. Provisional Patent Application No. 60/745,842, filed Apr. 27, 2006, and U.S. Provisional Patent Application No. 60/802,658, filed May 22, 2006, both of which are hereby incorporated herein by reference.

DETAILED DESCRIPTION

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, PARAGRAPH 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Many of electronic trading systems use a bid/offer process in which bids and/or offers are submitted to a system and can be hit or lifted, respectively. For example, a passive trader may submit a bid to buy a particular size of 30 year U.S. Treasury Bonds at a given price. In response to such a bid, an aggressive trader may submit a hit in order to indicate a willingness to sell bonds to the first trader at the given price. Alternatively, a passive side trader may submit an offer to sell a particular size of the bonds at the given price, and an aggressive trader may submit a lift (or take) in response to the offer to indicate a willingness to buy bonds from the passive side trader at the given price. In such trading systems, the bid, the offer, the hit, and the lift (or take) may be collectively known as trading orders.

In many electronic trading systems, trading orders may be placed by both market makers and customers, such as traders. A market-maker is a participant, such as a bank, who enters a bid and/or offer on an item and maintains such bid/offer, thereby adding liquidity to the market in which the item trades.

With respect to trading of financial instruments, banks may offer trade execution through a range of portals including their own trading systems and various electronic communication networks (ECNs). This has enabled third parties to exploit the banks' pricing systems and sometimes profit at the banks' expense. For example, banks are sometimes unable to directly disseminate their actual bid/offer prices to all potential counterparties because many third parties relay these prices after modifying them—e.g., by widening their spreads—in order to make profits on the trades they facilitate. As a result, market-makers are able to reach less customers with the market-makers' true prices.

Market-makers may alternatively disseminate their actual prices directly through a fully transparent market in which prices are available to all potential participants and in which trades are displayed as they are executed. However, this may be undesirable to certain customers, such as large banks, who prefer not to disclose such large transactions in which they partake. Moreover, by making their prices available for all to see and act on, banks become vulnerable to exploitation by third-parties who use system arbitrage strategies to buy an instrument on one system and then quickly sell it back to the same bank on another system that updates itself a fraction of a second more slowly than the first system. This can lead the banks, who may act as market-makers, to incur substantial losses as a result of trading with unprofitable counterparties with whom they would otherwise be unwilling to trade.

It would therefore be desirable to enable market-makers to disseminate their actual prices directly to a trading system such that these prices, and the trades executed thereon, are not readily available to all potential participants, while minimizing the risk of trading with unprofitable customers.

Figure 1:
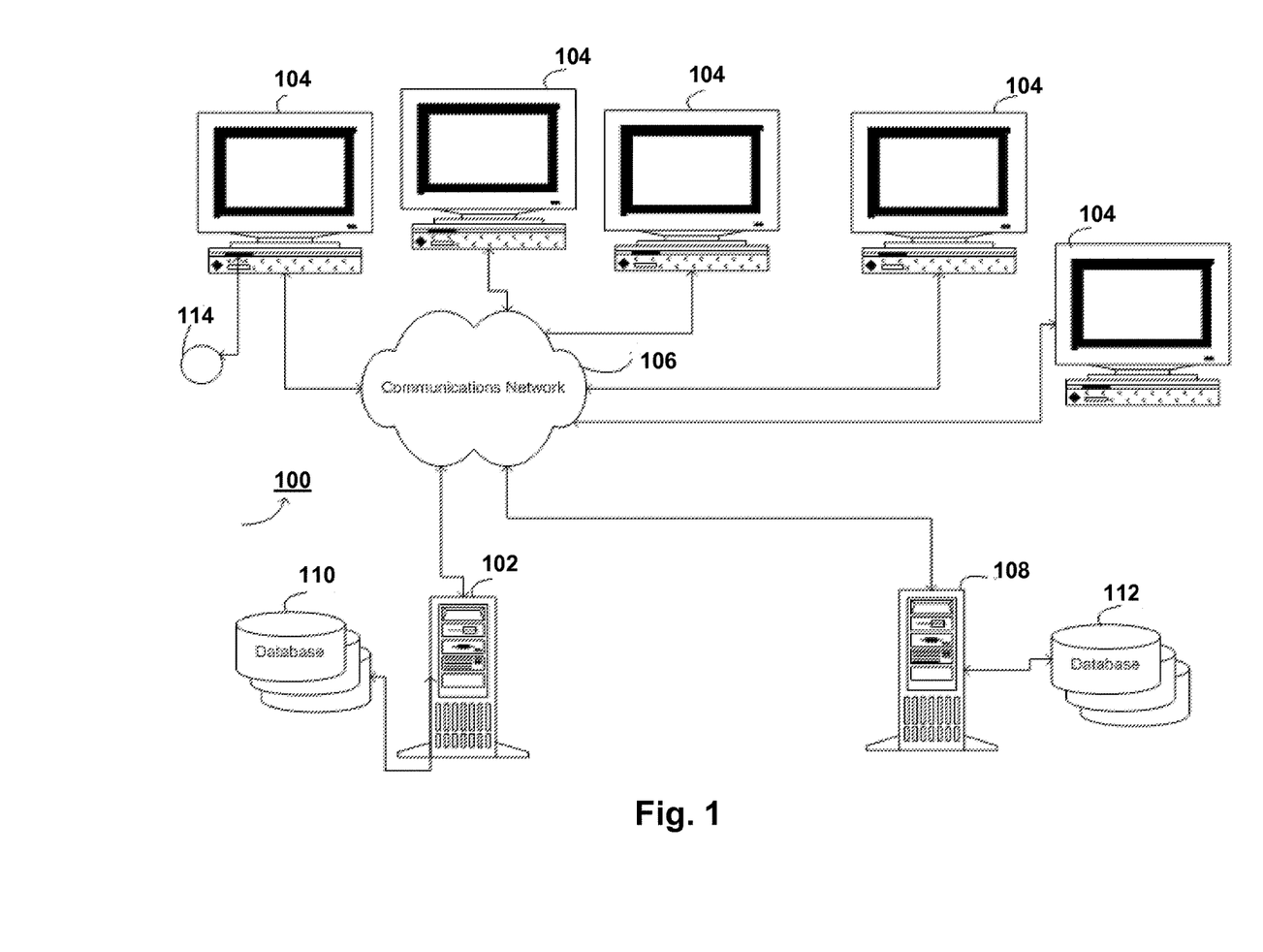
FIG. 1 depicts a system according to at least one embodiment of the systems disclosed herein.

Referring to FIG. 1, a system 100, according to at least one embodiment of the systems disclosed herein, includes at least one computing device, such as a remote computer 102 (e.g., a server computer), a client computer 104, or a combination thereof. The term remote in this context merely means that the remote computer 102 and at least one of the client computers 104 are separate devices. Thus, the devices may be remote even if they are located within the same room. In at least one embodiment, the system includes at least one remote computer 102 that is connected over a communication network 106 to one or a plurality of client computers 104. One or more of the client computers 104 may be connected to the remote computer 102 through a firewall. In another embodiment, at least one remote computer 102 is connected over a communication network 106 to at least one other remote computer 108.

The system 100 may be implemented over any type of communications network 106, such as a local area network (LAN), a wide area network (WAN), the Internet, a telephone network (POTS), a wireless network, including cellular, WiFi, and WiMax networks, or a combination of wired and/or wireless networks. In certain instances, the communications network 106 may be independent of the Internet or limited with respect to the type of the information transmitted over the Internet, such as to information that poses little or no security risk if misappropriated or that has been encrypted.

In the networked embodiment, client computers 104 are preferably configured or otherwise capable of transmitting and/or receiving communications to and/or from the remote computer(s) 102, 108. The remote computers 102, 108 may similarly be configured or otherwise capable of transmitting and/or receiving communications between themselves. This may be accomplished with a communication element, such as a modem, an Ethernet interface, a transmitter/receiver, etc., that enables communication with a similarly equipped remote computer 102,108 wirelessly, wired, or a combination thereof. It is understood that the relative functionality described herein may be provided by the remote computers 102, 108, by the client computers 104, or both, and is thus not limited to any particular one of the implementations discussed herein. In at least one embodiment, the client computers 104 will generally provide the front-end functionality and the remote computer 102, 108 will provide the back-end functionality.

The computing device, e.g., the client computers 104 and/or the remote computer 102, 108 generally include at least one processor, and a memory, such as ROM, RAM, FLASH, etc., including computer readable medium type memory, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 110, 112 for retrieving and/or storing the various types of data discussed herein, including identity verification data, such as an ID and password, biometric data, etc.

The client computers 104 may include, without limitation, a mobile phone, PDA, pocket PC, personal computer, as well as any special or other general purpose computing device. As such, the client computer 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 104, such as the PC or PDA, users may access the functionality provided by the system 100 with a browser application or any other generic application, or with special purpose software designed specifically for accessing the functionality disclosed herein.

In at least one embodiment, the client computer 104 includes or is otherwise associated with at least one biometric sensor 114. The biometric sensor 114 is any device that is used to determine directly from the user at least one item of biometric data associated with a user, such as a fingerprint reader, an iris scanner, a retinal scanner, a vascular pattern reader, a facial recognition camera, etc. The biometric sensor 114 may be embodied in hardware, software, or a combination thereof. The biometric sensor 114 may further share resources with other components of the client computer 104, such as the processor, memory, a camera, a microphone, a speaker, etc. A single biometric sensor 114 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 114 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

In at least one embodiment, methods and/or systems are provided that enable market-makers to disseminate their actual prices directly to a trading system such that these prices, and the trades executed thereon, are not readily available to all potential participants, while minimizing the risk of trading with unprofitable customers. This may be accomplished by providing markets that are not fully transparent, e.g., opaque markets, in which customers are allowed, under certain conditions, to see the actual prices and sizes made available by market-makers. More specifically, customers may be allowed to see the actual current prices, e.g., the highest bid and/or lowest offer, and/or corresponding sizes made available at these prices by market-makers for a particular instrument. Satisfaction of various conditions may be required prior to revealing the market-maker's actual market data. In at least one embodiment, a condition may be implemented that requires that the system first receive an indication that customers are willing to or actually commit to trade the particular instrument before the current prices can be communicated to the requesting customers.

Figure 2:
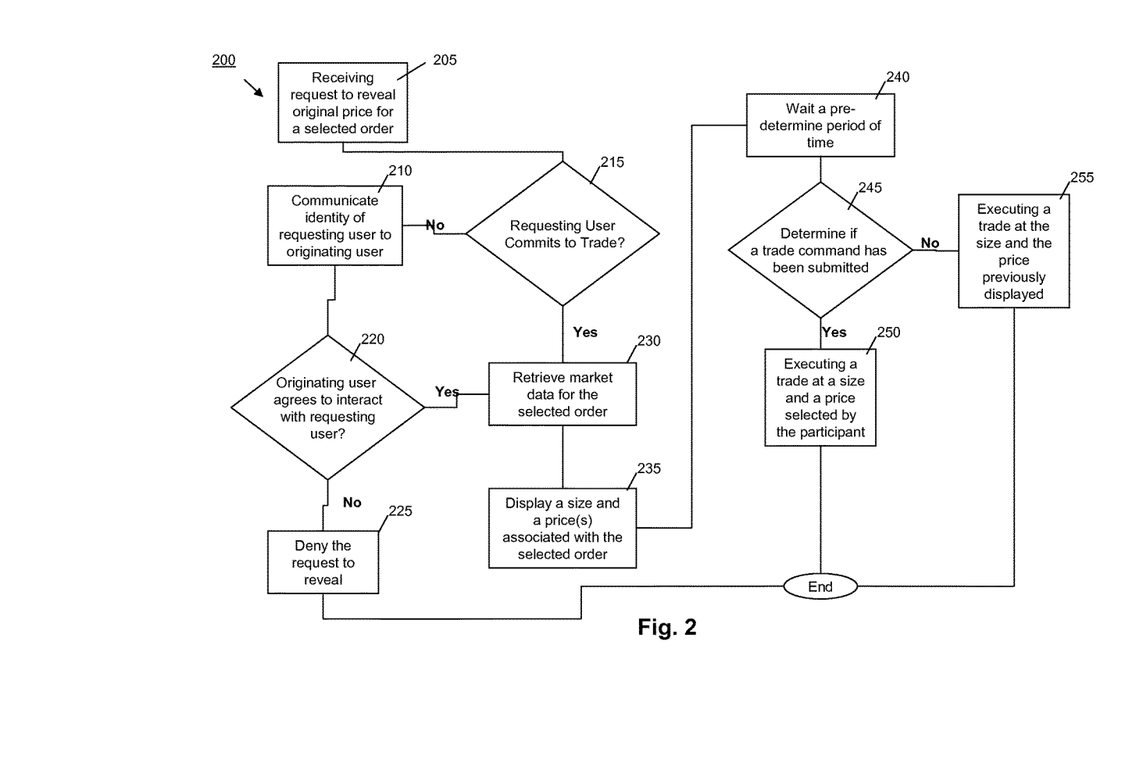
FIG. 2 depicts a flow diagram according to at least one embodiment of the methods disclosed herein.

In some embodiments, an electronic trading system receives bids and offers from multiple users, e.g., market-makers, on an instrument. Orders generally include market data such as a price, size, etc. As explained above, the price of the orders may not necessarily reflect the actual price specified by the originating user, e.g., the market maker. As such, an order may have associated therewith a first price, e.g., an original price, and a second price, e.g., that includes additions from intermediaries. A participant, e.g., a user of the present system, may request that the original order price for a selected order be revealed. That is, the user may request that the original price for a best bid or best offer, or any other bid or offer be revealed at 205. The request itself may be treated as an indication that the user is willing or actually commits to execute a trade on the instrument with the party submitting the order at the original price. This may be agreed upon between the system provider and the participant at some earlier time, e.g., during account set up. Alternatively or additionally, the system may prompt the participant to confirm that the participant commits to execute a trade in exchange for revealing the original price specified by, e.g., the market maker, to the participant.

The system may at 215 determine if the request is submitted by a permitted user, e.g., from a user that has committed to trade. If the requesting user has not committed, the identity of the requesting user may be communicated at 210 to the user submitting the order at the original price and the originating user may be given an opportunity to override the condition for the commitment. If it is determined at 220 that the originating user does not agree to interact with the requesting user without the commitment, the request may be denied at 225. Otherwise, the system may retrieve at 230 the market data for the selected order, including the original price of the order and/or the market price for the order if not communicated previously, and communicate and/or display the market data for the requesting user at 235 thereby revealing to the requesting user the original price of the order. For example, the participant may request to see an original offer price and the original offer price may be communicated/displayed for the participant in response thereto. The size available at the original price on the bid and/or the ask side may also be communicated and/or displayed. The prices associated with an order may be displayed with the size or sizes at substantially the same time automatically, e.g., in a common interface, or in response to receiving a further command from the participant.

In at least one embodiment, the market data (at least the original price) may be presented to the requesting user for a limited predetermine amount of time. For example, the order data may be displayed for 30 seconds, 60 seconds, 90 seconds, etc., or until the order is modified and/or cancelled. Accordingly, the system may wait for the predetermined period of time at 240 and determine thereafter at 245 whether the requesting user has submitted during the predetermine amount of time a trading command indicating that the requesting user has acted on the order for which the original price has been revealed. If the requesting user did submit a responsive trading command, the system may at 250 execute the trading command at the price and size specified by the requesting user. That is, the requesting user may trade a size greater or less than the size specified in the order by the originating user. For example, if the requesting user initially requested to see the sell side and subsequently submits a trade command to sell (or buy) a specific size at the current bid (or offer) price within the predetermined time period, a trade may be executed at the original bid (or offer) price for the specified size of the instrument as requested by the participant. Similarly, the requesting user and the originating user may agree to trade at a price different than the original price, e.g., either greater or less than the original price. The details of the trade may be worked out in a negotiation session involving one or more communications within the system between the parties.

In at least one embodiment, in the event the participant has not submitted a trade command within the predetermined time period following the presentation of the requested market data, a trade may be executed between the requesting user and the original user automatically for a particular size of the instrument. Such size may be the entire size of the order displayed to the requesting user, or a default or minimum size set by the participant and/or the system operator. The price at which the trade is executed may be the first or the second price, e.g., the original price or the market price, respectively, associated with the selected order. For example, if the participant initially requests to reveal the original price of an offer to sell an instrument and has not submitted a trade command within the predetermined time period, a trade may be executed automatically at the original price or at the market price. In some embodiments, the price at which the trade is executed automatically may also be a default or minimum price, e.g. a certain amount above or below the original price in a direction beneficial to the originating user, set by the participant or the system operator.

In certain embodiments, participants, such as market-makers, users of the trading system or other customers may be allowed to specify which counterparties they are willing to trade with and/or which counterparties they are not willing to trade with. Accordingly, if a customer with whom a particular market-maker has indicated an unwillingness to trade hits or lifts a particular bid or offer received from the same market-maker, no trade will be executed. Alternatively, the market-maker may be informed that a command to hit or lift the market-maker's bid or offer was received from an undesirable counterparty, or may be given the counterparty's identity, and may be given the option to proceed with, or modify, the trade.

Figure 3:
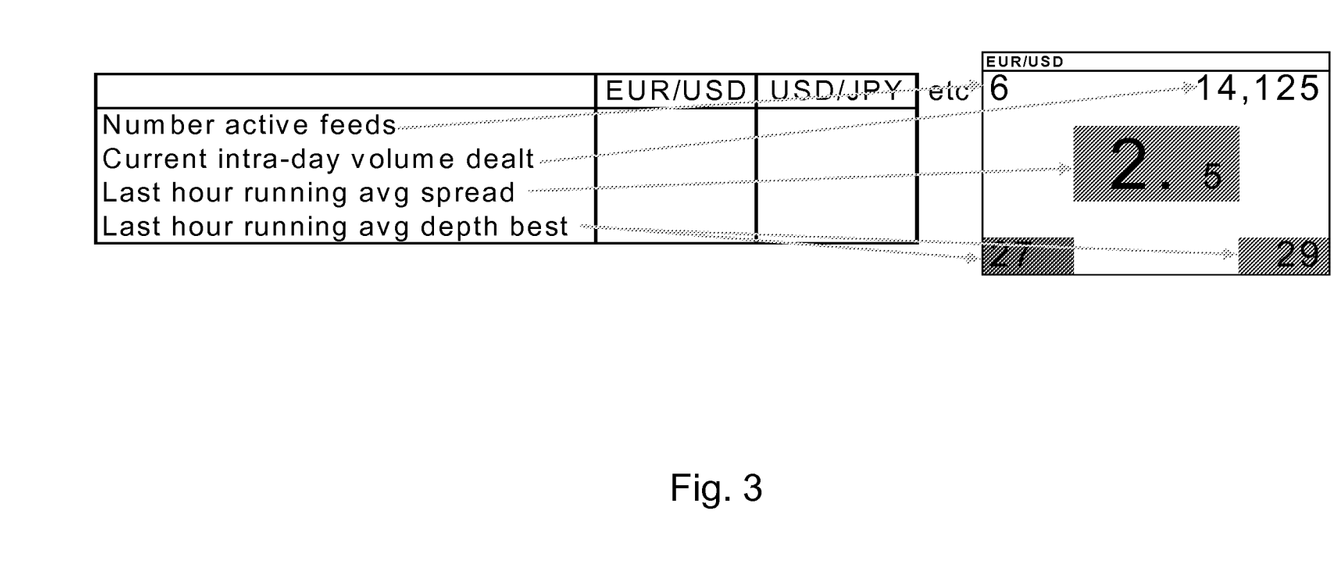
FIG. 3 depicts an interface screen for use in at least one embodiment of the methods and systems disclosed herein.

In time, the system may be implemented with a GUI (Graphical User Interface) available to users at each liquidity-provider bank. Although certain market data may still be withheld from such users, a limited indication of the system's activity may be made available on a new type of interface, such as the interface shown on FIG. 3. The interface shown in FIG. 3 is an example of one such GUI. The following example deals with currency trading. Nevertheless, the GUI is not limited to currency trading but may be extended to any traded item. In one embodiment, the GUI may show the real-time spread and the real-time bid and offer size (depth). The system may restrict this level of data from all users other than those qualified to participate in the limited-access trading system.

The following information may be made available from the trading system over the trading system API (Application Programming Interface) to allow GUI representation above: The number of feeds pricing a currency (or possibly number of active feeds that are price contributing at any one time); the volume/size traded since the start of that trading day (17:00 New York time); the hourly moving average best bid/offer spread seen in the trading system in that currency pair for the last hour; and the hourly moving average size seen at the best bid and offer level in that currency pair for the last hour. It should be noted that GUI users need to be able to have the GUI intelligently pick the big figure of any currency pair when trading upon it.

In yet another alternative embodiment, a "ShowMe Seller/ShowMe Buyer" button may be implemented, e.g., in the interface screen or in a keyboard. This button may be implemented as two separate buttons or as one combined button. This button may allow manual traders to reveal the real-time market (rate and size) for a limited time period when committing to execute a trade. In such an embodiment, the user reveals the real-time market by selecting either the ShowMe Seller or ShowMe Buyer command.

In still another embodiment, a "Start" button converts the average bid and offer size displayed above into a real bid/offer size for a system determined, or otherwise suitably-configurable, time. An "On" button may be implemented to make the "Average Spread" displayed above turn into a real bid/offer spread price for a system determined time. While the market is displayed, the user may elect to either buy or sell at any price. Following the execution of a transaction, the real-time markets may again be concealed. Finally, a "Trade" button may be shown or implemented on a custom keyboard that allows the customer to trade during his trade window.

At the conclusion of the display period, if the user has not traded the system will automatically execute a trade with the preference (Sell/Buy) initiated by the user request. In an alternative embodiment of the invention, a new order preference may be provided to allow users to submit orders with a price pegged off the best bid or best offer up to or down to a limit price. A pegged order may also make use of an offset from the same side bid/offer or offsets from the contra side. An offset may be either negative or positive to improve or worsen the user's pegged order with respect to the order from which the user is pegging.

A different order preference may be provided to allow users to submit a two sided market given a spread and a skew from one side of the market up to or down to a specific price. For example, a Better Seller preference may cause the system to submit a spread 3 increments wide, and having an offer no better than 1 increment worse than the best available offer.

Preferably, a custom keyboard according to the invention may include appropriate keys to allow manual users to enter bids/offers, buy/sell, switch currencies and enter "showme" and "pegged" commands as described in more detail above.

What is claimed is:

1. A method for facilitating electronic trading over a network with interfaces of computing devices, the method comprising:
   receiving, via an interface of a computing device of an electronic trading system, a request to reveal a first price of a selected order having a first price and a second price associated with the order, in which the request is submitted by an interface of a remote computing device of a user of an electronic trading system;
   transmitting, to a user on an interface of a remote computing device that is in communication with the interface of the computing device of the electronic trading system over a network, the first price and a size associated with the selected order;
   determining, via the computing device of the electronic trading system, that the interface of the remote computing device of the user has not submitted a trading command responsive to the order within a pre-determined period of time; and
   executing, via the computing device of the electronic trading system, the order at a default price and a default size.

2. The method of claim 1, in which the default price and the default size comprise, respectively, the first price and the size transmitted in response to the user's request to reveal.

3. The method of claim 1, in which the default price and the default size comprise, respectively, a price and a size that are pre-determined by the user.

4. The method of claim 1 further comprises:
   determining that the user is not permitted to trade; and
   denying the user's request to reveal.

5. The method of claim 4 further comprises:
   transmitting an identity of the denied user to an originating user; and
   receiving a request to permit the user previously denied to trade.

6. The method of claim 1 further comprises:
   receiving a list of users that are permitted to trade on the electronic trading system, in which the list of permitted users are pre-determined based on previous transactions with each user.

7. The method of claim 1, in which the first price comprises an original price and wherein the second price comprises a market price.

8. The method of claim 1, in which the act of executing the order at a default price and a default size comprises executing the order at a default price and a default size responsive to determining that the user has not submitted a trading command responsive to the order within a pre-determined period of time.

9. The method of claim 1, further comprising:
   after transmitting to a user the first price and a size associated with the selected order, causing the first price and the size to be displayed at a display device of the remote device.

10. An apparatus for facilitating electronic trading over a network with interfaces of computing devices, the apparatus comprising:
    a processor of a computing device of an electronic trading system; and
    a memory, in which the memory stores instructions which, when executed by the processor of the computing device of the electronic trading system, direct the processor of the computing device of the electronic trading system to perform:
    receiving, via an interface of a computing device of an electronic trading system, a request to reveal a first price of a selected order having a first price and a second price associated with the order, in which the request is submitted by an interface of a remote computing device of a user of an electronic trading system;
    transmitting, to a user on an interface of a remote computing device that is in communication with the interface of the computing device of the electronic trading system over a network, the first price and a size associated with the selected order;
    determining, via the computing device of the electronic trading system, that the interface of the computing system of the user has not submitted a trading command responsive to the order within a pre-determined period of time; and
    executing, via the computing device of the electronic trading system, the order at a default price and a default size.

11. The apparatus of claim 10, in which the default price and the default size comprise, respectively, the first price and the size transmitted in response to the user's request to reveal.

12. The apparatus of claim 10,
    in which the default price and the default size comprise, respectively, a price and a size that are pre-determined by the user.

13. The apparatus of claim 10, in which the memory stores instructions which, when executed by the processor, direct the processor to perform:
    determining that the user is not permitted to trade; and
    denying the user's request to reveal.

14. The apparatus of claim 13, in which the memory stores instructions which, when executed by the processor, direct the processor to perform:
    transmitting an identity of the denied user to an originating user; and receiving a request to permit the user previously denied to trade.

15. The apparatus of claim 10, in which the memory stores instructions which, when executed by the processor, direct the processor to perform:
    receiving a list of users that are permitted to trade on the electronic trading system, in which the list of permitted users are pre-determined based on previous transactions with each user.

16. The apparatus of claim 10, in which the first price comprises an original price and wherein the second price comprises a market price.

17. The apparatus of claim 10, in which the act of executing the order at a default price and a default size comprises executing the order at a default price and a default size responsive to determining that the user has not submitted a trading command responsive to the order within a pre-determined period of time.

18. The apparatus of claim 10, in which the memory stores instructions which, when executed by the processor, further direct the processor to:
   after transmitting to a user the first price and a size associated with the selected order, causing the first price and the size to be displayed at a display device of the remote device.

19. A method for facilitating electronic trading over a network with interfaces of computing devices, the method comprising:
   receiving, via an interface of a computing device of an electronic trading system, a request to reveal a first price of a selected order having a first and a second price associated with the order, in which the request is submitted by an interface of a remote computing system of a user of an electronic trading system;
   transmitting, to a user on an interface of a remote computing device that is in communication with the interface of the computing device of the electronic trading system over a network, the first price and a size associated with the selected order;
   monitoring, via the computing device of the electronic trading system, the interface of the remote computing device of the user for a trading command responsive to the order within a pre-determined period of time;
   receiving, via the interface of the computing device of the electronic trading system, a response trading command, in which the command to trade is submitted by the interface of the remote computing device within the pre-determined period of time and comprises, respectively, a price and a size specified by the user;
   executing, via the computing device of the electronic trading system, the bid or the offer at the price and the size specified by the user in the command to trade, wherein the price and size specified by the user is not the first or the second price of the order;
   transmitting an identity of the user to an interface of a remote computing device of an originating user; and
   receiving, via the interface of the computing device of the electronic trading system, from the interface of the remote computing device, a request to permit the user previously denied to trade.

20. A non-transitory machine-readable medium having instructions stored thereon that are configured to facilitate electronic trading over a network with interfaces of computing devices, when executed by at least one processor of a computing device of an electronic trading system, direct the at least one processor of the computing device of the electronic trading system to:
   receive a request to reveal a first price of a selected order having a first price and a second price associated with the order, in which the request is submitted by an interface of a remote computing device of a user of an electronic trading system;
   transmit to a user on interface of the remote computing device that is in communication with the computing device of the electronic trading system over a network, the first price and a size associated with the selected order;
   determine that the user has not submitted from the interface of the remote computing device a trading command responsive to the order within a pre-determined period of time; and
   execute the order at a default price and a default size.

* * * * *